United States Patent [19]

Mower et al.

[11] 4,286,351

[45] Sep. 1, 1981

[54] WIPER BLADES FOR VEHICLES

[75] Inventors: Peter Mower, Iwickenham; John H. Gadd, Sunningdale, both of England

[73] Assignee: Trico Products Corporation, Buffalo, N.Y.

[21] Appl. No.: 102,024

[22] Filed: Dec. 10, 1979

[30] Foreign Application Priority Data

Dec. 12, 1978 [GB] United Kingdom ............... 48088/78
Aug. 6, 1979 [GB] United Kingdom ............... 27319/79

[51] Int. Cl.³ .............................................. B60S 1/38
[52] U.S. Cl. ............................. 15/250.42; 15/250.32; 403/79; 403/363
[58] Field of Search ........... 15/250.32, 250.36–250.42; 403/79, 363

[56] References Cited

U.S. PATENT DOCUMENTS 3,585,672  6/1971  Habert .............................. 15/250.42

FOREIGN PATENT DOCUMENTS 2336071  2/1974  Fed. Rep. of Germany ............. 15/250
1495314  8/1967  France ................................... 15/250.32
1183446  3/1970  United Kingdom .................. 15/250.42

Primary Examiner—Peter Feldman
Attorney, Agent, or Firm—E. Herbert Liss

[57] ABSTRACT

A windscreen wiper blade harness comprising a plurality of metal yokes of channel cross section having at least one secondary yoke nested within and pivotally secured to primary yoke adjacent its end includes a plastic spacer of channel cross section disposed between the primary and secondary yokes for preventing metal to metal contact and providing the pivotal connection, the spacer being formed with a pair of internally extending aligned trunnions, one on each cheek which pivotally engage corresponding holes in the flanges of the secondary yoke, externally extending projections aligned with the internal trunnions which engage in corresponding holes in the flanges of the primary yoke and a radially extending flange which abuts the end of the primary yoke.

5 Claims, 7 Drawing Figures

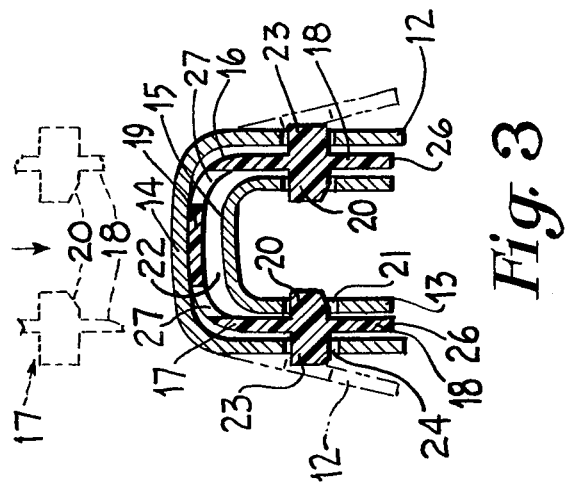
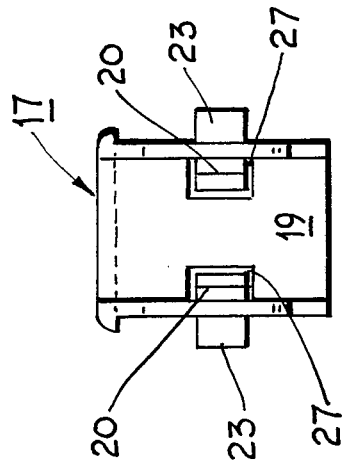
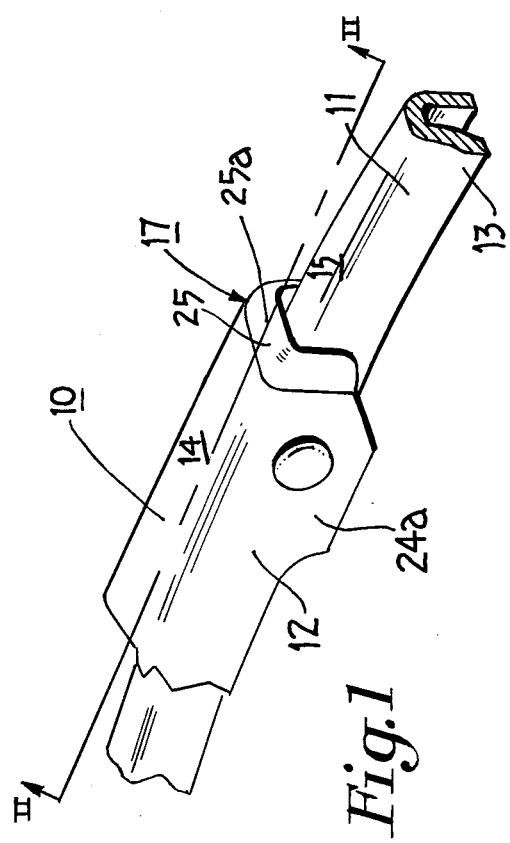
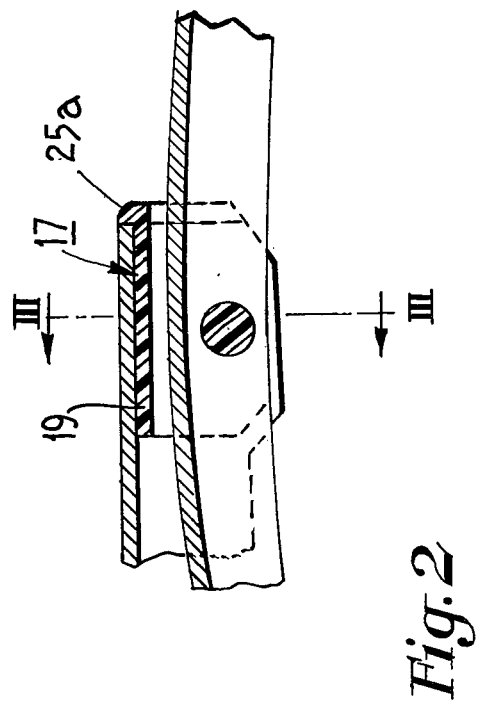

WIPER BLADES FOR VEHICLES

This invention relates to windscreen wipers and, more particularly, to a metal wiper blade harness provided with an improved plastic spacer and pivotal connection at the joints between the yokes to prevent metal to metal contact.

BACKGROUND OF THE INVENTION

Windscreen wiper blade harness assemblies typically include a plurality of levers or yokes pivotally connected together to form flexible, articulated lever assemblies. The axes where the yokes are pivotally connected become points of corrosion and sources of noise. Heretofore diverse forms of plastic spacers inserted at the pivotal joint have been devised to prevent the above mentioned problems. Such spacers should be of sufficient strength to avoid breakage at the stress points resulting from the relatively severe torsional and tensile loading which is applied in normal use as the wiper traverses a to and fro path with sudden reversals at each end of the wiper stroke. It is desirable to maintain the cross section as thin as possible for economy of materials, maintenance of minimum harness profile and size. The minimum size of the harness is important to avoid excess weight which results in additional load on the power source and also to avoid obstruction to the operator's view. The larger the cross section of the spacer, the larger the harness lever cross section must be to accomodate it. Furthermore, since the wipers are a highly visible accessory it is desirable to avoid an awkward appearance. Ease of assembly is another important requisite.

An example of a prior art plastic spacer is disclosed in U.K. Pat. No. 1,183,446 published Mar. 4, 1970 in which a first part U-shaped in cross section and a similarly shaped insert are nested in spaced apart relationship and connected together at the end of the leg portion. The said first part and insert are so spaced as to define a U-shaped recess between them. This recess is dimensioned to receive a similarly cross sectioned end of a yoke. Pairs of projections extend inwardly and outwardly from the legs of the insert, the outward projections being received in openings of a harness main yoke and the inward projections engaging in openings of an auxiliary yoke to pivotally secure the yokes to each other. The inward and outward projections on each leg are displaced relative to each other to be out of alignment. It is not possible to provide the usual ears employed in this type of blade harness for accomodating the openings in the main yoke because the end of the blade must fit into the channel shaped recess, thus necessitating the offset positions of the projections.

Offsetting the projections exposes the spacer to shear stresses during operation which could cause fracturing of the walls unless the wall section is relatively thick.

SUMMARY

The present invention provides a spacer, channel shaped in cross section, with aligned internal and external trunnions which can withstand substantial torsional and tensile loading without recourse to thickening the spacer cheeks in order to strengthen them. The thickness of the spacer cheeks may be about 0.5 mm; the diameter of the trunnions if they are of circular section as shown may be preferably about 3 mm.

Furthermore by arranging the trunnions internally of the present spacer so that the secondary yoke pivots on them, it is possible to deepen the channel section of the spacer so that its web or back contacts the web or back of the primary yoke and enables the spacer to be moulded with a radial flange which not only covers up sharp edges on the adjoining end of the primary yoke but also abuts upon the primary yoke end and produces a neat appearance.

The principal object of the present invention is to provide a neat, economical plastic spacer at the joints between yokes of a windscreen wiper harness which facilitates assembly, serves as a pivotal connection and can withstand the stresses applied without fracturing during operation of the wiper under extreme operating conditions.

Another object of the invention is to provide a neat, economical plastic spacer construction at the joints between yokes of windscreen wiper harnesses which utilize a minimum of material and facilitates molding thereof.

Other objects and advantages of the invention will be apparent from the following detailed description taken in connection with the accompanying drawings.

BRIEF DESCRIPTION OF THE DRAWINGS

FIG. 1 is a perspective view of a joint between yoke fragments of a wiper blade harness embodying a first form of spacer;

FIG. 2 is a longitudinal section of FIG. 1 taken on line II—II;

FIG. 3 is a transverse section on line III—III of FIG. 2;

FIG. 4 is an underside plan of the spacer for use in the joint; and

DETAILED DESCRIPTION OF THE PREFERRED EMBODIMENTS

Figure 5:
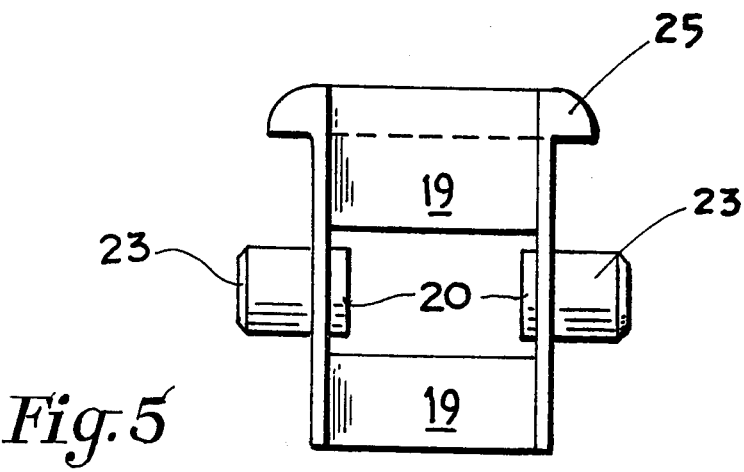
FIGS. 5 to 7 are underside plan, end and side views respectively of a second form of spacer for use in the joint.

Referring to FIGS. 1 to 3 fragments of a primary yoke 10 and a secondary yoke 11 of a harness are shown where an end of yoke 10 makes a pivotal joint with yoke 11 between its ends. The yokes 10, 11 are both of metal of U section which is inverted in relation to a wiper strip (not shown) carried by the harness, and comprise respective flanges 12, 13 which extend down from respective webs 14, 15.

The secondary yoke 11 lies in the channel of the primary yoke 10 and a clearance gap 16 exists between the two yokes.

Contact between the yokes 10, 11 throughout the range of pivotal and side-play movements at the joint is prevented by a spacer 17 of moulded plastics which is retained on one end of the primary yoke 10 as hereinafter described. The spacer 17 extends into the gap 16. It is also of inverted U section and comprises cheeks 18 which extend down from opposite sides of a web 19 of the spacer.

The spacer cheeks 18 are each formed with one of a pair of internally extending trunnions 20 for pivotal engagement on corresponding holes 21 in the flanges 13 of the secondary yoke 11, there being between the respective webs 19, 15 of the spacer and secondary yoke a clearance gap 22 which is adequate for a full working range (about 10°–15°) of pivotal movement of the secondary yoke 11 in the channel of the primary yoke 10.

The spacer cheeks 18 are also each formed with one of a pair of external projections 23 which are aligned with the trunnions 20 and engage in corresponding holes 24 in ears 24a in the primary yoke flange 12, thereby holding the spacer and the secondary yoke captive in the joint. The holes 24 are located in the ears 24a near the end of the primary yoke 10. The projections 23 are preferably of circular cross-section as shown.

The right-hand end of the spacer 17 in FIG. 1 extends beyond the channel of the primary yoke 10 in the longitudinal sense and has a radial flange 25 which extends adjacent to the end of the primary yoke 10 to cover up sharp metal edges and to improve appearances with a rounded bevel 25a. The spacer web 19 preferably lies in contact with the primary yoke web 14 and the radial flange 25 abuts upon the end of the primary yoke.

The spacer 17 has flexibility and preferably resilience so that the spacer can be assembled by presenting it to the web of the secondary yoke in the manner indicated by broken lines in FIG. 3, and moving the spacer in the direction of the arrow. The bottom edges 26 of the spacer cheeks 18 and/or the corners of the yoke web 15 are preferably rounded and the lower parts of the trunnions 20 are preferably chamfered to facilitate spreading of the spacer cheeks 18 as the spacer is being pushed on to the yoke 11. The spacer 17 is in position on the yoke 11 when the trunnions engage in the holes 21. The trunnions make snap engagement with the holes 21 if the spacer has resilient flexibility. The spacer 17 and yoke 11 are then put in the channel of the primary yoke 10 which is in a partially formed condition as indicated in broken lines in FIG. 3, the flange 12 diverging and the projections 23 being adjacent to the holes 24 in the flanges. The flanges 12 are then brought parallel to one another so that the projections 23 engage in the holes 24.

The spacer 17 may be made as disclosed in co-pending U.S. patent application Ser. No. 079,045 filed Sept. 26, 1979 by an injection moulding technique involving no side core if the spacer web 19 has an opening 27, as in FIGS. 3 and 4 opposite each trunnion 20. A moulding tool part, after moulding the corresponding trunnion in co-operation with a complementary part of the tool, can withdraw through the opening 27. Thus the spacer is moulded with a pair of openings 27 in its web 19, the openings 27 being on opposite sides of a medial line of the spacer which extends parallel to the spacer cheeks, and each such opening 27 extending opposite a respective internal trunnion 20 towards the medial plane of the spacer from the cheek from which the respective trunnion extends.

Figure 6:
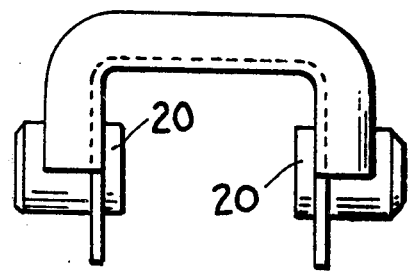
Figure 7:
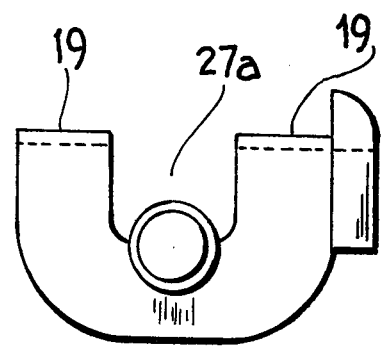

Alternatively, as disclosed in application Ser. No. 079,045, the spacer may be as shown in FIGS. 5 to 7 of the present specification, namely moulded with a single opening 27a which extends in the web 19 from side to side of the spacer and in the cheeks of the spacer to the internal trunnions 20.

An improved wiper blade harness having a unique plastic spacer serving as a pivotal joint between the yokes which is of thin wall construction, utilizes a simplified mould and is resistant to fracture caused by stressed of operation, uses minimal material and adds no bulk to the blade has been shown and described. It is simple to assemble and neat in appearance.

Although certain specific embodiments of the invention have been shown and described for the purpose of illustration, it will be apparent that in accordance with the broader aspects of the invention various modifications and other embodiments are possible within the scope of the invention. For example, the channels of the yokes and spacer illustrated may be essentially of V section, rounded or truncated at the apex or back. It is, therefore, to be understood that the invention is not limited to the specific arrangement shown but in its broadest aspects includes all equivalent embodiments and modifications which come within the scope of the invention.

What is claimed is:

1. In a wiper blade assembly comprising a harness having a primary yoke and at least one secondary yoke pivotally connected along its length to an end of the primary yoke at a joint therebetween, the yokes being of metal and each including a back portion, a pair of flanges extending down therefrom and being of similar cross section at said joint, the secondary yoke being disposed relative to the primary yoke so that the flanges thereof overlap the secondary yoke where they are pivotally connected at said joint between them, and a spacer of resilient plastics of similar cross-section to the yokes disposed between them at said joint to prevent metal-to-metal contact; the improvement wherein the spacer consists of a web and a pair of cheeks, each cheek having one of a pair of internally extending trunnions pivotally snap engaged in corresponding holes in the flanges of the secondary yoke, and the spacer cheeks each further being formed with one of a pair of externally extending projections which are aligned coaxially with the internal trunnions and engage in and extend through corresponding holes in the primary yoke flanges and hold the spacer and thereby the secondary yoke captive in the joint.

2. A wiper blade assembly according to claim 1, in which the spacer web lies in contact with the primary yoke back portion and a radial flange moulded on the spacer abuts upon the adjoining end of the primary yoke.

3. A wiper blade assembly according to claim 1 in which said externally extending projections on the spacer cheeks are of circular cross-section and are coaxial with the internal trunnions.

4. A wiper blade assembly according to claim 1 in which the thickness of each cheek of the spacer is 0.5 mm.

5. A plastic spacer to prevent metal to metal contact and to pivotally join an end of metal primary yoke of U-shaped cross section to a similarly shaped secondary yoke of windshield wiper blade harness, said spacer consisting of a web and a pair of cheeks depending from said web to form a U-shaped member of cross section similar to the cross section of said yokes and extends into a gap between the primary yoke and the secondary yoke and lies in contact with the primary yoke, a radial flange on an end of said spacer to abut an adjacent end of the primary yoke, each cheek having one of a pair of internally extending aligned trunnions, and each spacer cheek having one of a pair of externally extending projections, said trunnions and projections all being coaxial, circular in cross section and extendable through corresponding circular openings in the adjacent flanges of the secondary yoke and primary yoke respectively, said spacer being resilient and flexible to enable the cheeks of the spacer to be spread during assembly and the internal trunnions to snap into the holes in the secondary yoke, the web of the spacer including an open area such open area extending opposite at least one of said trunnions.

* * * * *

UNITED STATES PATENT AND TRADEMARK OFFICE
CERTIFICATE OF CORRECTION

PATENT NO. : 4,286,351
DATED : September 1, 1981
INVENTOR(S) : Peter Mower & John H. Gadd It is certified that error appears in the above-identified patent and that said Letters Patent are hereby corrected as shown below:

In the Abstract, line 4 - Change "to primary" to --to a primary--.
Column 3, line 62 - "stressed" should be --stresses--.

Signed and Sealed this

Twenty-fourth Day of November 1981

[SEAL]

Attest:

Attesting Officer

GERALD J. MOSSINGHOFF
Commissioner of Patents and Trademarks